(12) United States Patent
Miyazaki et al.

(10) Patent No.: US 7,324,958 B2
(45) Date of Patent: Jan. 29, 2008

(54) INFORMATION ADMINISTERING SYSTEM FOR AN EATING HOUSE

(75) Inventors: Takao Miyazaki, Saitama (JP); Keizo Uchioke, Saitama (JP); Satoru Goto, Saitama (JP); Kazuo Okoyama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 834 days.

(21) Appl. No.: 10/209,920

(22) Filed: Aug. 2, 2002

(65) Prior Publication Data
US 2003/0040967 A1 Feb. 27, 2003

(30) Foreign Application Priority Data
Aug. 2, 2001 (JP) .............................. 2001-235303

(51) Int. Cl.
G06Q 30/00 (2006.01)
G06Q 50/00 (2006.01)

(52) U.S. Cl. .............................. 705/15; 705/16; 705/25

(58) Field of Classification Search .................. 705/15, 705/16, 17, 18, 19, 20, 21, 22, 23, 24, 25
See application file for complete search history.

(56) References Cited

U.S. PATENT DOCUMENTS

| | | | | | |
|---|---|---|---|---|---|
| 3,267,436 | A | * | 8/1966 | Alpert et al. .................. | 705/15 |
| 3,310,797 | A | * | 3/1967 | Auger ..................... | 340/286.09 |
| 3,821,707 | A | * | 6/1974 | Peters ......................... | 340/7.2 |
| 4,074,793 | A | * | 2/1978 | Yuter .......................... | 186/38 |
| 4,128,757 | A | * | 12/1978 | Garner, Jr. ................... | 235/383 |
| 4,222,111 | A | * | 9/1980 | Sloan et al. ............ | 340/286.09 |
| 4,388,689 | A | * | 6/1983 | Hayman et al. ............... | 705/15 |
| 4,396,985 | A | * | 8/1983 | Ohara .......................... | 705/15 |
| 4,516,016 | A | * | 5/1985 | Kodron .................. | 235/462.49 |
| 4,518,821 | A | * | 5/1985 | Yuter .......................... | 379/172 |
| 4,530,067 | A | * | 7/1985 | Dorr ............................ | 705/15 |

(Continued)

FOREIGN PATENT DOCUMENTS

JP 5-282339 * 10/1993

(Continued)

OTHER PUBLICATIONS

White, Ron, How Computers Work, Millennium Ed., Que Corporation, Sep. 22, 1999.*

(Continued)

*Primary Examiner*—Michael Cuff
(74) *Attorney, Agent, or Firm*—Birch, Stewart, Kolasch & Birch, LLP

(57) ABSTRACT

A customer of an eating house orders refreshments by pressing a first touch panel provided at a customer's seat, watching a liquid-crystal monitor on which a menu of the refreshment and an average cooking time thereof are displayed. A cook inputs cooking-state information with a second touch panel provided in a kitchen when cooking is started and is completed. The cooking-state information is displayed on the liquid-crystal monitor so that it is possible to confirm a cooking state of the ordered refreshment. When the ordered refreshment is untouched, the customer can cancel or urge the refreshment by pressing the first touch panel. Upon instructing a check with the first touch panel, the check is printed out from a printer. The customer can order, cancel and urge the refreshments without calling a waitperson.

12 Claims, 5 Drawing Sheets

U.S. PATENT DOCUMENTS

| | | | | |
|---|---|---|---|---|
| 4,547,851 | A * | 10/1985 | Kurland | 705/15 |
| 4,553,222 | A * | 11/1985 | Kurland et al. | 705/15 |
| 4,582,172 | A * | 4/1986 | Takeuchi et al. | 186/38 |
| 4,701,849 | A * | 10/1987 | Elden | 705/11 |
| 4,722,053 | A * | 1/1988 | Dubno et al. | 463/42 |
| 4,800,438 | A * | 1/1989 | Yuter | 348/836 |
| 5,003,472 | A * | 3/1991 | Perrill et al. | 705/15 |
| 5,018,066 | A * | 5/1991 | Yagi | 705/21 |
| 5,128,862 | A * | 7/1992 | Mueller | 705/15 |
| 5,262,938 | A * | 11/1993 | Rapoport et al. | 705/15 |
| 5,504,589 | A * | 4/1996 | Montague et al. | 358/403 |
| 5,828,294 | A * | 10/1998 | Shank | 340/326 |
| 5,832,446 | A * | 11/1998 | Neuhaus | 705/1 |
| 5,838,798 | A * | 11/1998 | Stevens, III | 705/21 |
| 5,839,115 | A * | 11/1998 | Coleman | 705/15 |
| 5,845,263 | A * | 12/1998 | Camaisa et al. | 705/27 |
| 5,980,089 | A * | 11/1999 | Weis | 700/213 |
| 6,026,372 | A * | 2/2000 | Savage | 705/15 |
| 6,038,546 | A * | 3/2000 | Ferro | 705/15 |
| 6,049,780 | A * | 4/2000 | Fuyama | 705/15 |
| 6,087,927 | A * | 7/2000 | Battistini et al. | 340/286.09 |
| 6,102,162 | A * | 8/2000 | Teicher | 186/39 |
| 6,208,976 | B1* | 3/2001 | Kinebuchi et al. | 705/15 |
| 6,366,196 | B1* | 4/2002 | Green et al. | 340/286.09 |
| 6,425,524 | B2* | 7/2002 | Pentel | 235/381 |
| 6,441,808 | B1* | 8/2002 | Hashimoto | 345/173 |
| 6,553,386 | B1* | 4/2003 | Alabaster | 707/104.1 |
| 6,618,062 | B1* | 9/2003 | Brown et al. | 715/822 |
| 6,636,835 | B2* | 10/2003 | Ragsdale-Elliott et al. | 705/15 |
| 6,646,659 | B1* | 11/2003 | Brown et al. | 715/811 |
| 2002/0188495 | A1* | 12/2002 | Banerjee et al. | 705/10 |
| 2003/0158763 | A1* | 8/2003 | McKee | 705/7 |

FOREIGN PATENT DOCUMENTS

| | | |
|---|---|---|
| JP | 09-044569 | 2/1997 |
| JP | 105786 | 4/2000 |

OTHER PUBLICATIONS

Derfler, Frank J. et. al. How Networks Work, Millennium Ed., Que Corporation, Aug. 23, 2000.*

Gralla, Preston, How the Internet Works, Millennium Ed., Que Corporation, Sep. 23, 1999.*

Muller, Nathan J., Desktop Encyclopedia of the Internet, Artech House, Inc., 1998.*

Bragg, Steven M., Accounting Best Practices, John Wiley and Sons, Inc., 1999.*

MasterCook User Manual, MasterCook 3.0, Sierra On-Line, Inc., 1995.*

"Signal Your Waiter with Beck 'N Call", San Jose Mercury News, Associated Press, Street edition, p. 7A, May 20, 1986.*

* cited by examiner

INFORMATION ADMINISTERING SYSTEM FOR AN EATING HOUSE

BACKGROUND OF THE INVENTION

1. Field of the Invention

The present invention relates to an information administering system for an eating house of a restaurant or the like.

2. Description of the Related Art

Conventionally, in eating houses of a restaurant or the like, information administering systems of the POS (point-of-sale) system and so forth are used for the purposes of shortening a preparation time of ordered refreshments, saving labor for totaling up sales, and efficiently managing a menu of the refreshments, for instance. As to this kind of the information administering system for the eating house, Japanese Patent Laid-Open Publication No. 9-44569 teaches a system for reducing a labor and a time of a waitperson caused by acceptance of an order and calculation of a check. In this system, customers themselves order the refreshments with an information terminal-unit (self POS). Further, the customers calculate prices of the ordered refreshments by themselves with the information terminal-unit. In the meantime, Japanese Patent Laid-Open Publication No. 2000-105786 teaches another information administering system in which it is possible to grasp the refreshments, of which the preparation time exceeds a predetermined value, as a delay refreshment menu. Incidentally, the preparation time means a time spent for serving the refreshments. In this system, a waitperson inputs data into an information terminal-unit of a handy terminal and so forth. The data includes order information of the refreshments ordered by a customer, and order-receipt time data. Further, the data includes supply time data of the ordered refreshments. The preparation time is calculated from the order-receipt time data and the supply time data of the ordered refreshments.

However, the above information administering systems for the eating house do not grant an advantage to the customer, since the purposes of the system are to save the labor of the eating house and to improve the efficiency thereof. For example, when there are inquiries about a cooking time of the refreshment to be ordered, a serving time of the ordered refreshment, cancellation of the ordered refreshment, and reminder of the ordered refreshment, there arises a problem in that the waitperson is called at each time for confirmation and commission.

SUMMARY OF THE INVENTION

In view of the foregoing, it is a primary object of the present invention to provide an information administering system for an eating house, in which a customer can easily confirm cooking times of refreshments to be ordered without calling a waitperson of the eating house.

It is a second object of the present invention to provide an information administering system for an eating house, in which a customer can easily confirm cooking states of ordered refreshments without calling a waitperson of the eating house.

It is a third object of the present invention to provide an information administering system for an eating house, in which a customer can easily cancel or urge ordered refreshments without calling a waitperson of the eating house.

In order to achieve the above and other objects, the information administering system according to the present invention comprises a first information terminal-unit disposed at a customer's seat, and a second information terminal-unit disposed at a kitchen.

The first information terminal-unit comprises an instruction-information inputting member by which a customer sends instruction information to the eating house. The first information terminal-unit also comprises a guidance displaying member by which the eating house supplies guidance information to the customer.

The second information terminal-unit comprises an instruction-information displaying member by which the instruction information is displayed in the kitchen. The second information terminal-unit also comprises a cooking-information inputting member by which a cook inputs cooking-state information of the ordered refreshments.

The instruction information is preferable to include at least one of order information representing the ordered refreshment and quantity thereof, cancelation information for canceling the ordered refreshment, reminder information for urging the ordered refreshment, and check information for instructing a check. In a preferred embodiment, the first information terminal-unit has a printer for printing out the check in response to the check information.

The guidance information is preferable to include at least one of menu information of the refreshments, price information thereof, average-cooking-time information thereof, image information thereof, food-value information thereof, and cooking-state information thereof.

According to the present invention, it is possible to avoid an idle waiting time so that a comfortable mealtime may be supplied.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
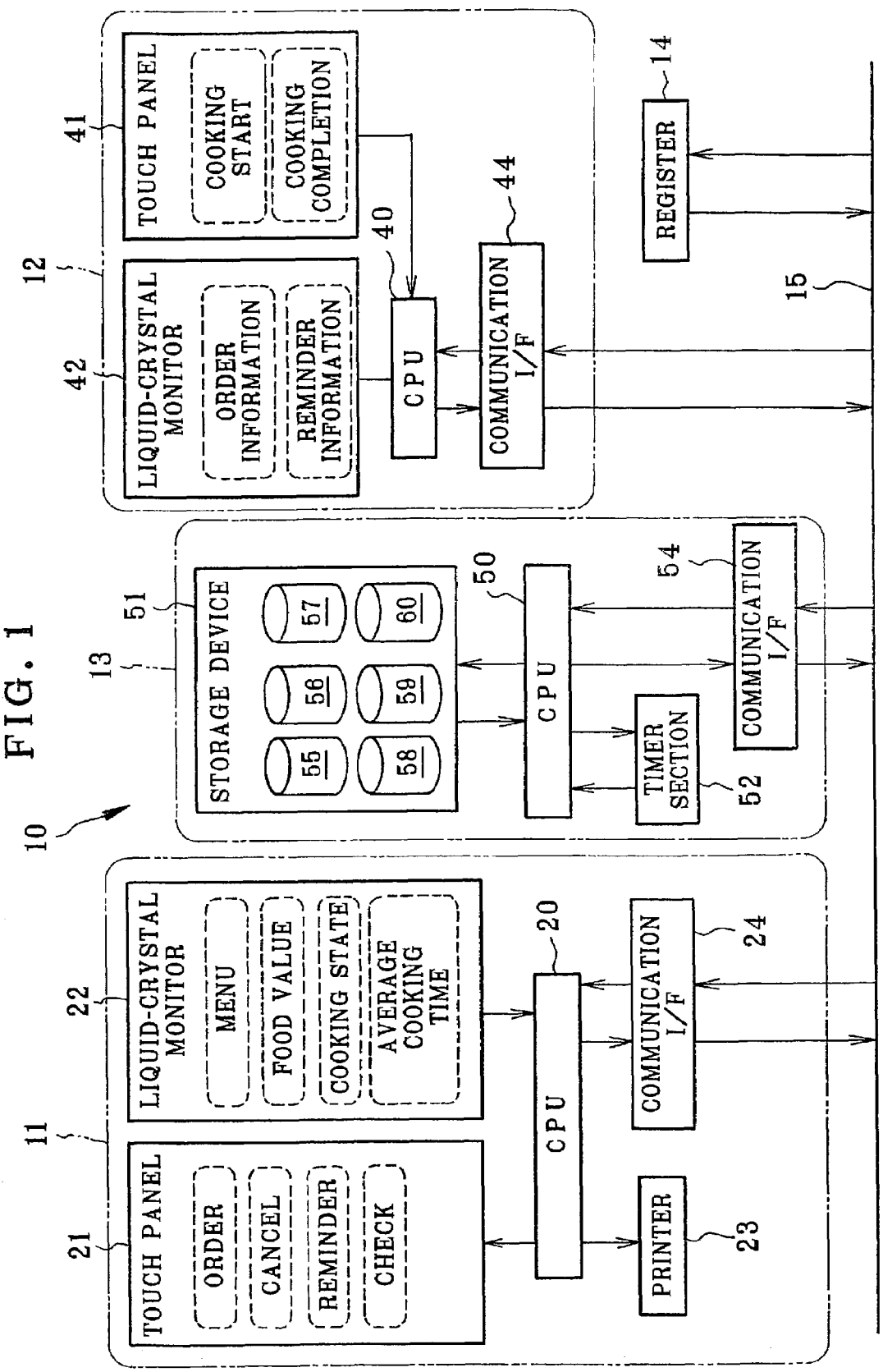
FIG. 1 is a block diagram schematically showing an information administering system according to the present invention.

FIG. 1 is a block diagram schematically showing an information administering system 10 according to the present invention. The information administering system 10 is constituted of a seat-side information terminal-unit 11 disposed at a customer's seat, a kitchen-side information terminal-unit 12 disposed at a kitchen, a restaurant computer 13, a register 14 and so forth, which are connected via a network 15.

Figure 2:
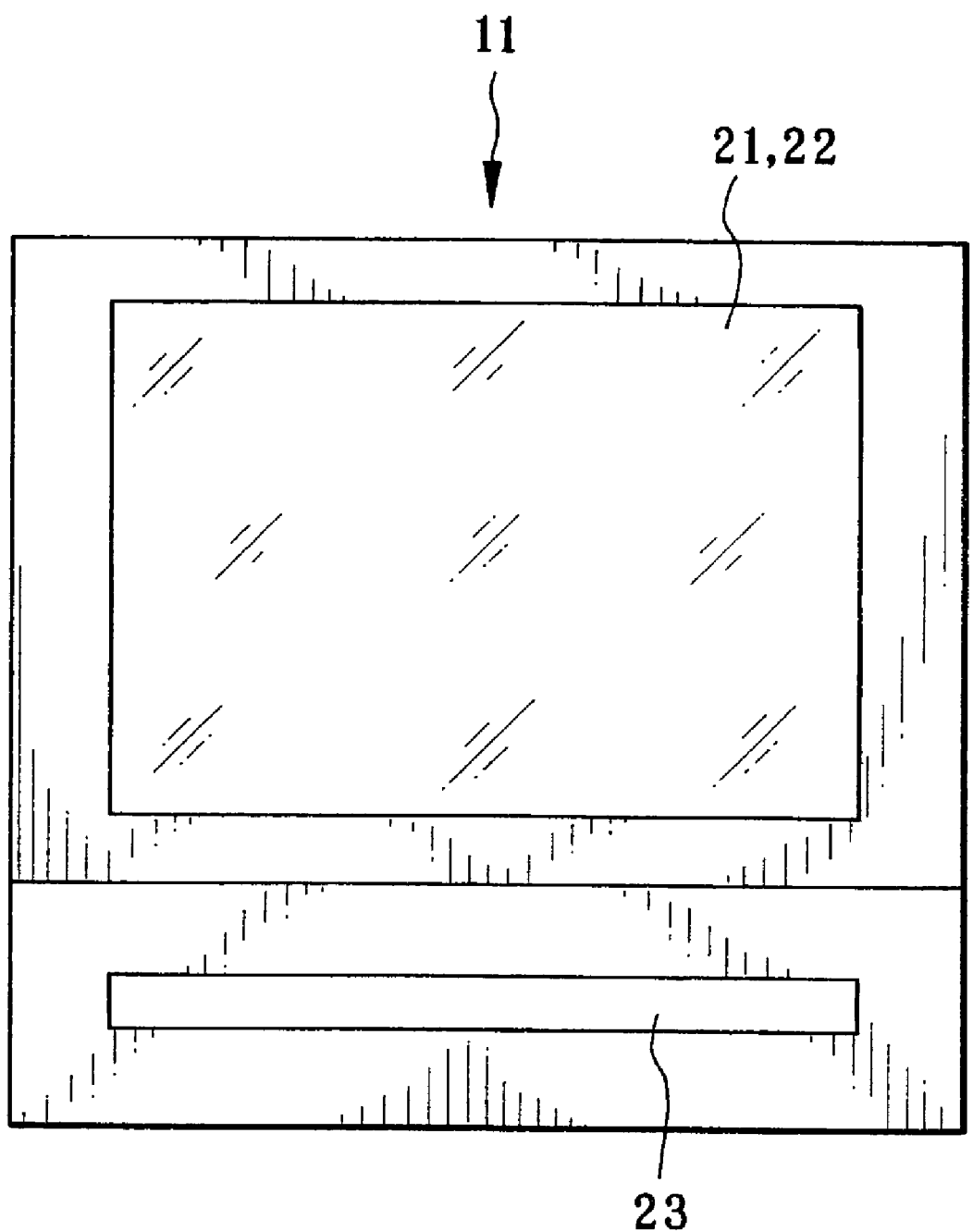
FIG. 2 is a plan view showing an information terminal-unit of a customer's seat.
Figure 3A:
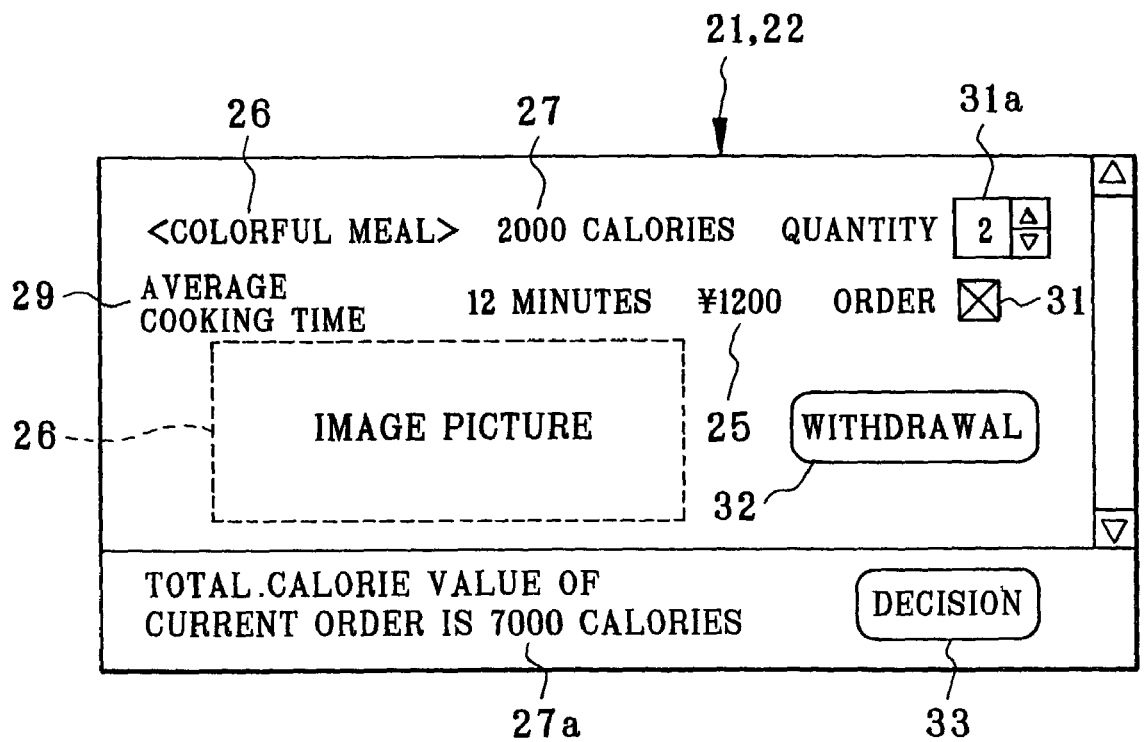
FIGS. 3A and 3B are plan views respectively showing a liquid-crystal monitor and a touch panel.
Figure 3B:
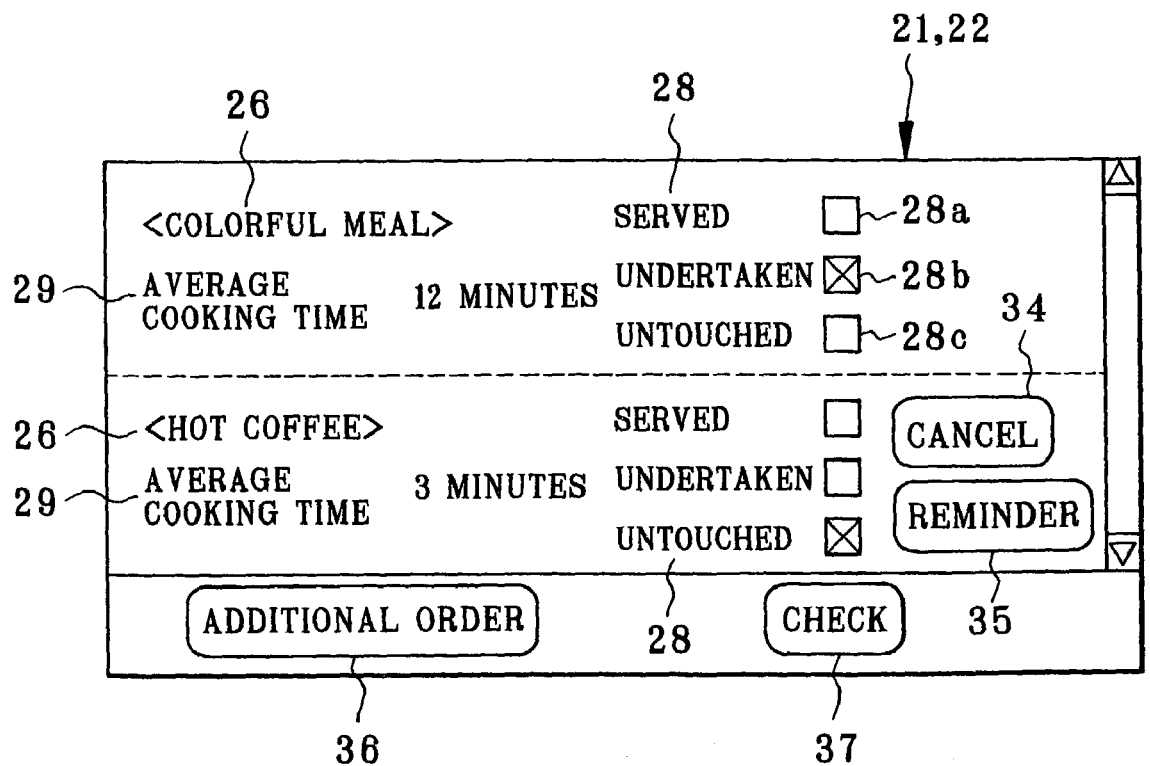

The seat-side information terminal-unit 11 includes a CPU 20, a touch panel 21, a liquid-crystal monitor 22, a printer 23, a communication I/F 24. The touch panel 21, the liquid-crystal monitor 22 and the printer 23 are unified (see FIG. 2). As shown in FIGS. 3A and 3B, the liquid-crystal monitor 22 displays guidance information supplied from an eating house to a customer. The guidance information is inputted from the restaurant computer 13 via the network 15 connected to the communication I/F 24. The guidance information includes price information 25 of refreshments, menu information 26 thereof, food-value information 27, cooking-state information 28, and average-cooking-time information 29.

The customer inputs instruction information by pressing any of an order-button area 31, a withdrawal-button area 32, a decision-button area 33, a cancel-button area 34, a reminder-button area 35, an additional-order-button area 36, and a check-button area 37, which are displayed on the touch panel 21 in accordance with the guidance information. The inputted instruction information is transferred to the restaurant computer 13 via the network 15.

In the drawings, the sole terminal unit 11 is merely shown. However, the terminal unit 11 is disposed at each seat one by one. A proper number of the terminal units 11 are arranged in accordance with a seat number of the eating house.

In FIG. 1, the kitchen-side information terminal-unit 12 includes a CPU 40, a touch panel 41, a liquid-crystal monitor 42, and a communication I/F 44. The touch panel 41 and the liquid-crystal monitor 42 are unified. The liquid-crystal monitor 42 displays order information and reminder information, which are inputted from the restaurant computer 13 and are described later. A cook prepares the refreshments on the basis of the order information displayed on the liquid-crystal monitor 42. At this time, the cook inputs cooking start information with the touch panel 41 when starting the preparation of the refreshments. Further, the cook inputs cooking completion information with the touch panel 41 when completing the preparation of the refreshments. The above information are respectively transferred to the restaurant computer 13 via the network 15 connected to the communication I/F 44.

The restaurant computer 13 totally controls the whole of the information administering system 10, and is constituted of a CPU 50, a storage device 51, a timer section 52, a communication I/F 54 and so forth. In the storage device 51, are constructed a menu database 55, a food-value database 56, a price database 57, a cooking-time database 58, an order information database 59, and a cooking-state information database 60.

The menu database 55 stores the menu information 26 including image pictures of the respective refreshments. The price database 57 stores the price information of the respective refreshments. The CPU 50 transmits the menu information 26 and the price information to the seat-side information terminal-unit 11 via the network 15 when the customer selects the refreshments. The food-value database 56 stores the food-value information 27 of the respective refreshments. The CPU 50 transmits the food-value information 27 of the selected refreshment to the seat-side information terminal-unit 11 via the network 15.

The cooking-time database 58 stores the cooking time of the respective refreshments. The cooking time is measured by the timer section 52 on the basis of a cooking start signal and a cooking completion signal, which are inputted from the kitchen-side information terminal-unit 12. The measured cooking time is accumulated in the cooking-time database 58 one after another. From measured values of the cooking time of each refreshment, the CPU 50 calculates the average cooking time of the refreshment selected by the customer. The calculated average cooking time is transmitted to the seat-side information terminal-unit 11 via the network 15 as the average-cooking-time information 29.

The order information database 59 stores the ordered refreshments, quantities thereof and so forth as the order information of the respective terminal units 11. The CPU 50 transmits the order information to the kitchen-side information terminal-unit 12 via the network 15.

The cooking-state information database 60 stores the cooking-state information 28 representing the cooking state of the ordered refreshment. Concretely, the cooking-state information 28 represents any of "served (cooked)" state, "undertaken (in cooking)" state, and "untouched" state. The cooking state of the refreshment is determined by judging whether the cooking start information and the cooking completion information are inputted or not from the kitchen-side information terminal-unit 12. The CPU 50 transmits the cooking-state information 28 to the seat-side information terminal-units 11.

As shown in FIG. 3B, the liquid-crystal monitor 22 of the seat-side information terminal-unit 11 notifies any state of the refreshment, which is one of the "served" state, the "undertaken" state, and the "untouched" state, to the customer by marking one of indication regions 28a to 28c in accordance with the cooking-state information 28. When the refreshment is in the "untouched" state, the cancel-button area 34 and the reminder-button area 35 are displayed on the touch panel 21 so that it is possible to input the instruction information for cancelling or urging the refreshment.

Upon pressing the cancel-button area 34, the instruction information of cancelation is transmitted to the restaurant computer 13. In response to this, the CPU 50 sends the order information representing that the refreshment is canceled, to the kitchen-side information terminal-unit 12. At the same time, the CPU 50 deletes the refreshment data from the order information database 59 and the cooking-state information database 60. Meanwhile, upon pressing the reminder-button area 35, the instruction information of reminder is transmitted to the restaurant computer 13. In response to this, the CPU 50 sends the reminder information representing that the refreshment is urged, to the kitchen-side information terminal-unit 12.

Upon pressing the check-button area 37, the instruction information of a check is transmitted to the restaurant computer 13. In response to this, the CPU 50 makes up print data of the check on the basis of the order information stored in the order information database 59. The print data is transmitted to the seat-side information terminal-unit 11. In accordance with the print data, the seat-side information terminal-unit 11 prints out the check from the printer 23. The customer brings the check to the register 14 to pay it. After the customer completes the payment at the register 14, the CPU 50 deletes the order information and the cooking-state information of the refreshments, which are ordered from the seat-side information terminal-unit 11 used by the customer having paid the check, from the order information database 59 and the cooking-state information database 60.

Figure 4:
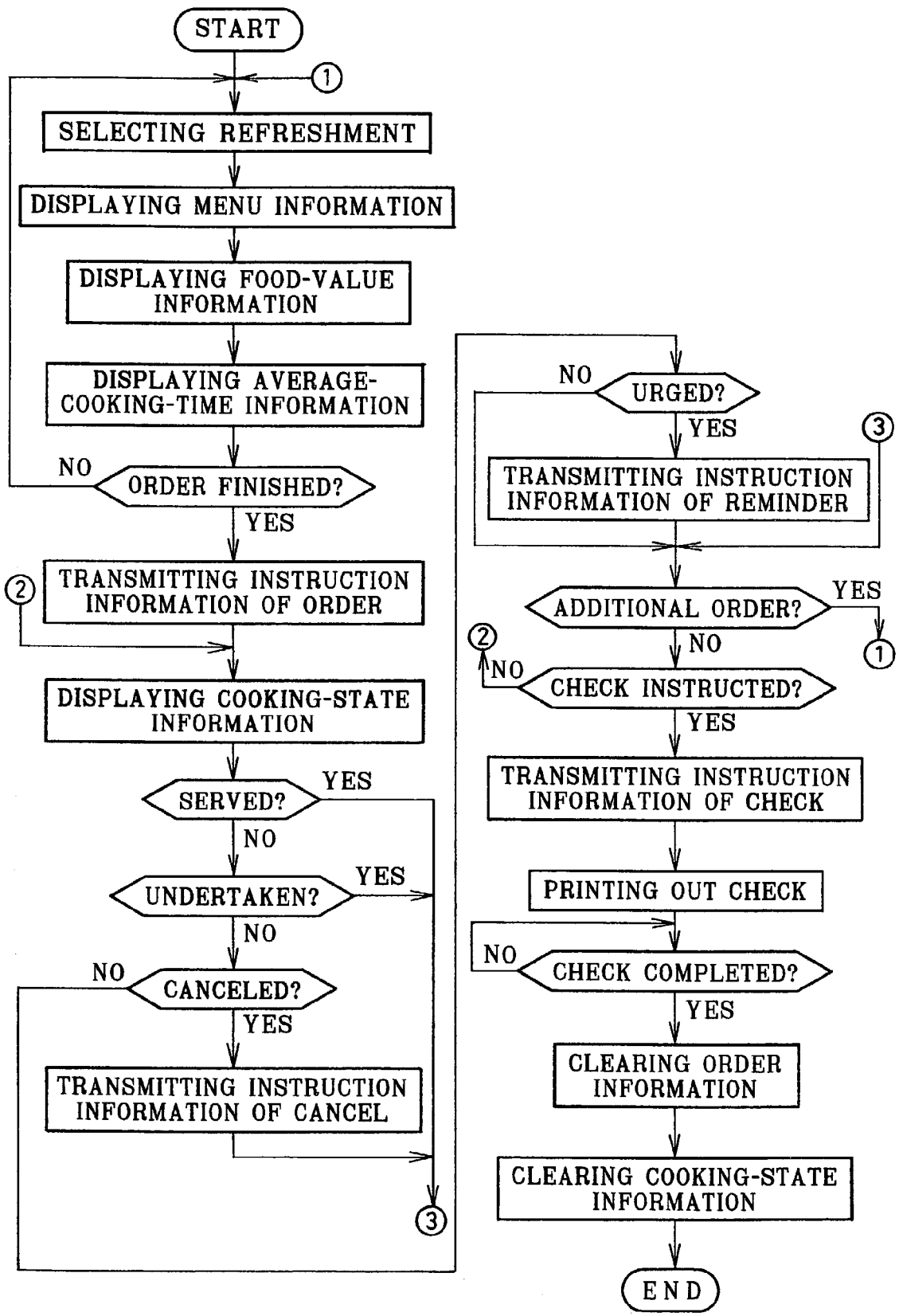
FIG. 4 is a flow chart explaining an operation of the information administering system.

Successively, an operation of the above structure is described below, referring to a flow chart shown in FIG. 4. At the outset, the customer selects the refreshment from the menu displayed on the seat-side information terminal-unit 11. Upon selection of the refreshment, the liquid-crystal monitor 22 displays the menu information 26 of the selected refreshment, the food-value information 27 thereof, and the average-cooking-time information 29 thereof (see FIG. 3A).

After selecting a quantity of the ordered refreshment with a quantity selection region 31a, the customer presses the order-button area 31 to determine the order. If there is the refreshment to be additionally ordered, the above operation is repeated. In this case, the food values of all of the ordered refreshments are totaled up to display total-food-value information at a lower portion of the picture. After completing the selection of the refreshments to be ordered, the decision-button area 33 is pressed.

When the decision-button area 33 is pressed, the instruction information of the order is transmitted from the seat-side information terminal-unit 11 to the restaurant computer 13. On the basis of the instruction information of the order, the restaurant computer 13 transmits the order information to the kitchen-side information terminal-unit 12. At the same time, the restaurant computer 13 transmits the cooking-state information to the seat-side information terminal-unit 11. The liquid-crystal monitor 22 of the seat-side information terminal-unit 11 displays the cooking-state information (see FIG. 3B). In this way, it is possible to order the refreshments without calling a waitperson of the eating house.

When the ordered refreshments are in the served state or in the undertaken state, the liquid-crystal monitor 22 displays only the additional-order-button area 36 and the check-button area 37. If the additional-order-button area 36 is pressed, the menu of the refreshments is displayed again on the liquid-crystal monitor 22 so that it becomes possible to order the refreshment similarly to the above. Meanwhile, when the ordered refreshments are in the untouched state, the liquid-crystal monitor 22 displays the cancel-button area 34 and the reminder-button area 35 as well.

When canceling the ordered refreshment, the cancel-button area 34 is pressed. Owing to this, the instruction information of the cancellation is transmitted to the restaurant computer 13 by which the cancel information of the ordered refreshment is transmitted to the kitchen-side information terminal-unit 12. At the same time, the data corresponding to the canceled refreshment is deleted from the order information database 59 and the cooking-state information database 60.

The reminder-button area 35 is pressed when urging the ordered refreshment. Upon this, the instruction information of reminder is transmitted to the restaurant computer 13 by which the reminder information that the ordered refreshment is urged is transmitted to the kitchen-side information terminal-unit 12. In this way, it is possible to cancel or urge the ordered refreshment without calling the waitperson of the eating house.

When the customer presses the check-button area 37 after having the meal, the instruction information of the check is transmitted to the restaurant computer 13. On the basis of the order information stored in the order information database 59, the restaurant computer 13 makes up the print data of the check and transfers it to the seat-side information-terminal unit 11. The printer 23 of the seat-side information terminal-unit 11 prints out the check on the basis of the print data.

The customer brings the check to the register 14 to make the payment. After the payment has been completed, the order information and the cooking-state information of the refreshments, which are ordered from the seat-side information terminal-unit 11 used by the customer having paid the check, are deleted from the order information database 59 and the cooking-state information database 60. Even if the refreshments are additionally ordered, it is prevented to issue plural checks so that a checking process is simplified.

Figure 5:
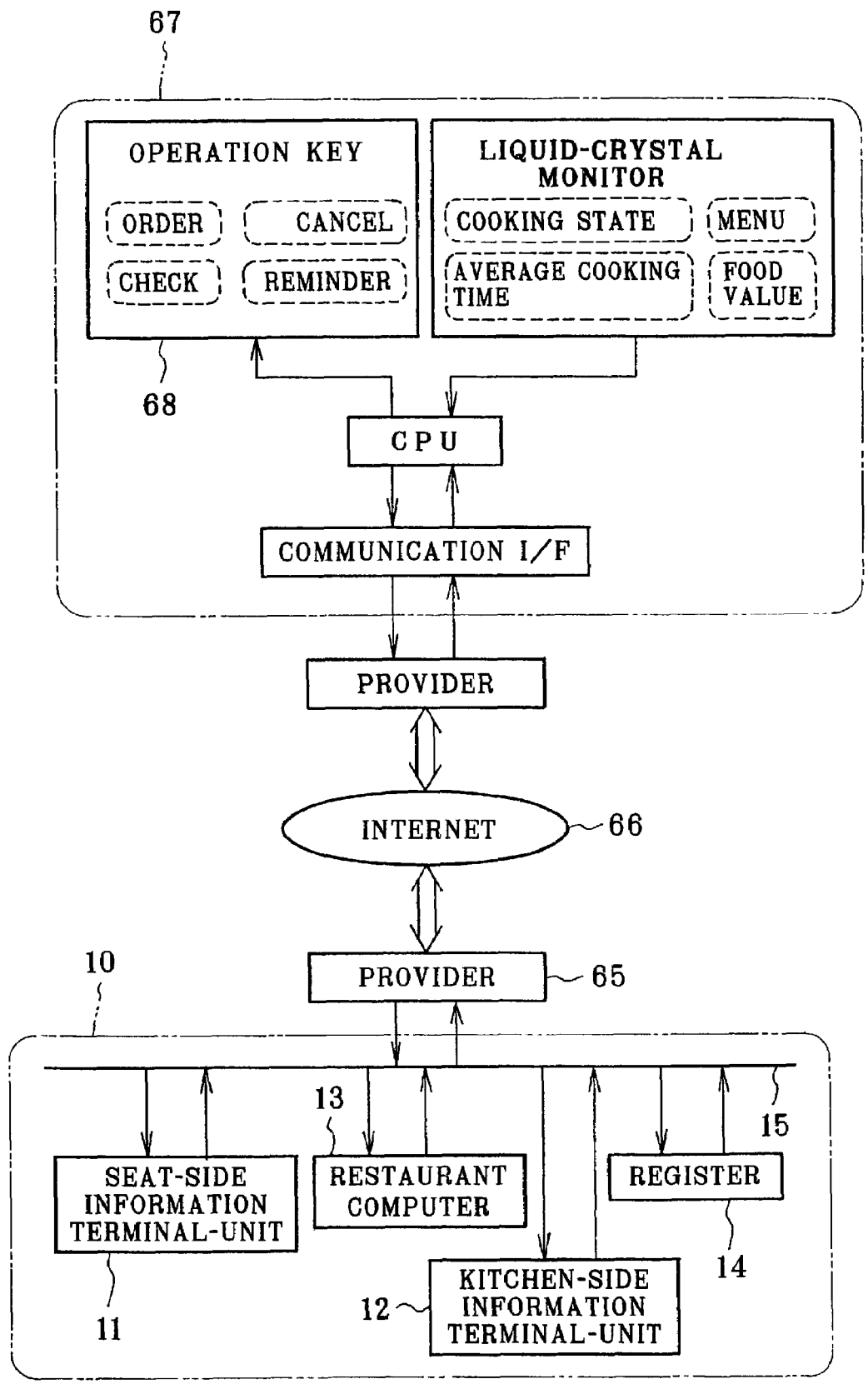
FIG. 5 is a block diagram schematically showing an information administering system of a second embodiment.

In the above embodiment, the refreshments are ordered from the seat-side information terminal-unit disposed at the customer's seat. However, as shown in FIG. 5, the information administering system 10 may be connected to the Internet 66 via a provider 65. In doing so, the instruction of the order and so forth is performed with a cellular phone 67 via the Internet 66, instead of the seat-side information terminal-unit. In addition, the guidance may be given from the eating house to the customer via the Internet 66. In this case, an operation key 68 of the cellular phone 67 is used for inputting the instruction information. Besides the cellular phone, a PDA (Personal Digital Assistant) and a personal computer may be used if it is possible to connect these apparatuses to the Internet 66.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An information administering system for an eating house, comprising:
   a first information terminal-unit disposed at a customer's seat of said eating house, said first information terminal-unit including a first touch panel on a display for inputting instruction information offered from a customer to said eating house, and guidance-information display means for displaying guidance information given from said eating house to said customer;
   a second information terminal-unit disposed in a kitchen of said eating house, said second information terminal-unit including instruction-information display means for displaying said instruction information in said kitchen, and a second touch panel for inputting cooking-state information of refreshments cooked in said kitchen; and
   a determining unit for determining whether cooking of refreshments has started or not, wherein a cancel button for allowing said customer to cancel the refreshments is displayed on the display of the first information terminal-unit when the determining unit determines that the cooking of the refreshments has not started.

2. An information administering system for an eating house according to claim 1, wherein said instruction information includes at least one of order information representing the refreshment to be ordered and a quantity thereof, cancel information for cancelling the ordered refreshment, reminder information for urging the ordered refreshment, and check information for instructing a check.

3. An information administering system for an eating house according to claim 2, wherein said first information terminal-unit includes print means for printing out the check in response to an input of said check information.

4. An information administering system for an eating house according to claim 2, wherein said guidance information includes at least one of menu information of the refreshments, price information thereof, image-picture information thereof, average-cooking-time information thereof, food-value information thereof, and cooking-state information thereof.

5. An information administering system for an eating house according to claim 4, further comprising:
   a restaurant computer connected to said first and second information terminal-units via a network, said restaurant computer having at least one database concerning said respective information.

6. An information administering system for an eating house according to claim 5, wherein said at least one database is any of a menu database, a food-value database, a price database, a cooking-time database, an order information database, and a cooking-state information database.

7. An information administering system for an eating house according to claim 6, wherein said cooking-state information of the refreshment represents any of a served state, an undertaken state, and an untouched state; and
wherein in said undertaken state, the second touch panel is pressed just before preparation of the refreshment is started, and in said untouched state, the second touch panel is not pressed and the preparation of the refreshment is not started.

8. An information administering system for an eating house according to claim 6, wherein said instruction information is inputted by pressing said first touch panel.

9. An information administering system for an eating house according to claim 8, wherein said guidance-information display means of said first information terminal-unit is a first liquid-crystal monitor.

10. An information administering system for an eating house according to claim 9, wherein said instruction-information display means of said second information terminal-unit is a second liquid-crystal monitor.

11. An information administering system for an eating house according to claim 10, wherein said cooking-state information is inputted by pressing said second touch panel.

12. An information administering system for an eating house according to claim 6, wherein said first information terminal-unit is a cellular phone connected to said second information terminal-unit via the Internet.

* * * * *